United States Patent [19]

Biggs et al.

[11] 4,349,605

[45] Sep. 14, 1982

[54] FLAME RETARDANT RADIATION CURABLE POLYMERIC COMPOSITIONS

[75] Inventors: James W. Biggs, Lebanon; Melvin F. Maringer, Cincinnati, both of Ohio

[73] Assignee: National Distillers & Chemical Corp., New York, N.Y.

[21] Appl. No.: 185,460

[22] Filed: Sep. 9, 1980

[51] Int. Cl.³ .......................... C08F 2/54; C08K 3/22; C08K 5/09; C08K 5/20
[52] U.S. Cl. ............................... 428/389; 204/159.13; 204/159.2; 525/106; 525/288; 524/87; 524/229; 524/563
[58] Field of Search ....................... 204/159.2, 159.13; 260/23 R, 32.6 PQ; 428/389

[56] References Cited

U.S. PATENT DOCUMENTS

| 2,765,293 | 10/1956 | Happoldt | 260/32.6 PQ |
| 2,997,526 | 8/1961 | Kessel et al. | 260/37 EP |
| 3,407,162 | 10/1966 | Rundle | 260/32.6 PQ |
| 3,832,326 | 8/1974 | North et al. | 260/42.29 |
| 3,922,442 | 11/1975 | North et al. | 260/42.15 |

*Primary Examiner*—John C. Bleutge
*Assistant Examiner*—A. H. Koeckert
*Attorney, Agent, or Firm*—Kenneth D. Tremain

[57] ABSTRACT

Radiation crosslinked compositions containing copolymers of ethylene and a vinyl ester or an acrylate, a hydrated inorganic filler, a higher concentration of silane than employed heretofore and a lubricant of lauric acid and ethylene-bis-stearamide exhibit physical strength properties substantially similar to a chemically crosslinked counterpart.

15 Claims, No Drawings

FLAME RETARDANT RADIATION CURABLE POLYMERIC COMPOSITIONS

BACKGROUND OF THE INVENTION

1. Field of the Invention

This invention relates to radiation crosslinkable polymeric compositions which exhibit moisture, heat and flame resistance and which are useful in producing insulated wire and cable as well as molded products. More particularly, it relates to a radiation crosslinkable ethylene-vinyl ester or acrylate copolymer composition having a radiation crosslinked tensile strength substantially equal to a chemically crosslinked copolymer composition of the same general composition.

2. Description of the Prior Art

One of the most important areas where fire resistant polymer compositions find use is in the electrical environment, i.e., where both insulating and fire resistant properties are sought, most especially in the area of conductor insulation. At one time, extrudable compositions available to the wire and cable art were required, for flame resistance, to contain halogenated polymers such as chlorinated polyethylene, polyvinyl chloride, chlorobutadiene, chlorinated paraffin, etc., together with antimony trioxide, both components being present in sizable quantities. Alternatively, a coating of chlorosulfonated polyethylene paint was applied to a nonflame retardant insulating compound which constituted an additional manufacturing operation.

For certain types of dry transformers, particularly high voltage transformers, a problem existed in that electrical failures occurred due to surface creepage of the organic insulating component used. The problem was solved through the addition of hydrated alumina to compositions whose organic binder consisted of butyl rubber, epoxy resins or polyester resins. However, these compositions do not possess a balance of excellent extrudability characteristics, physical and electrical properties, heat resistance and flame retardance. Such compositions are disclosed in U.S. Pat. Nos. 2,997,526-7 and 8 of Kessel et al. The described compositions for such usage have poor tensile strength, elongation and percent elongation retained after aging.

Fire retarding polymeric compositions exhibiting, inter alia, improved moisture and heat resistance consisting essentially of an intimate mixture of at least one crosslinkable polymer containing as a major component an ethylenevinyl acetate copolymer, one or more silanes and one or more hydrated inorganic fillers have found wide acceptance in the wire and cable art. Compositions such as these are disclosed in U.S. Pat. Nos. 3,832,326 and 3,922,442 of North et al. These patents disclose compositions which contain 80 to 400, preferably 125-140 weight parts of filler per 100 weight parts of polymer and 0.5 to 5.0 parts of silane per 100 parts of filler. No specific concentration range of lubricant is disclosed although 2 parts of calcium stearate per 100 parts of polymer are utilized in all of the fourteen compositions of the examples.

The prior art polymeric compositions of North et al. exhibit a unique combination, or balance, of improved physical and electrical properties together with a high degree of flame and fire retardance. These highly desirable results are achieved without the use of halogenated polymers such as polyvinyl chloride and chlorosulfonated polyethylene, thereby eliminating hydrogen chloride fumes; without carbon black, thereby permitting its use as colored insulations; without any flame retardant coatings such as are currently required, thereby eliminating an additional step in manufacturing operations when the compositions are used as, e.g., insulating compounds extruded onto a conductor; and without antimony trioxide, thereby eliminating a very expensive compound.

Such compositions find particular use as white (an inherent property) and colored uniinsulation compositions, which can be extruded over metal, e.g., copper or aluminum, conductors, to provide a single layer insulating and jacketing composition which is rated according to U.L. standards for 90° C. operation, and in some cases operation at temperatures as high as 125°, at up to 600 volts.

The insulating compositions of North et al. have found particular utility in the insulation of switchboard wire, appliance wire, and automotive wire where a unique combination of superior electrical properties combined with resistance to the degradative effects of heat and flame are essential, and where low smoke density and non-corrosive fumes are desirable.

North et al. prefer to crosslink the ethylenevinyl acetate copolymers in their compositions by irradiation with high energy sources or through the use of chemical crosslinking agents. As has been observed with other radiation cured polymeric compositions, radiation cured compositions prepared in accordance with the disclosures of North et al. have poorer physical strength properties than their peroxide cured counterparts. The reasons for this are not fully understood although the precise nature and amount of the major and minor components in the composition are thought to be a contributing factor. Attempts to improve the physical strength of North et al.-type compositions have not met with appreciable success to date.

Two North et al.-type crosslinkable polymeric compositions as shown in the examples, particularly Example II, demonstrate this difference. One product is peroxide curable while the other is radiation curable. Several modifications were made to the peroxide curable product to produce the radiation curable counterpart. The copolymer in the radiation curable product has a higher vinyl acetate content and aluminum stearate has been substituted for the calcium stearate lubricant. Although this has improved the physical strength of the radiation cured composition over what it would have been, it is still significantly lower than the peroxide cured product.

It is an object of this invention to provide a radiation crosslinkable ethylene copolymer composition having physical strength properties in its crosslinked state which are superior to those obtained heretofore.

It is another object of this invention to provide a radiation crosslinkable ethylene copolymer composition which not only exhibits superior moisture, heat and flame resistance but also possesses superior physical strength when it is crosslinked than has been obtained heretofore.

SUMMARY OF THE INVENTION

In accordance with the present invention, it has been found that the physical strength of radiation cured ethylene copolymers (particularly ethylene-vinyl acetate copolymers) compositions containing silane-treated hydrated inorganic fillers can be significantly improved if (1) a lubricant composition comprising lauric acid and ethylene-bis-stearamide is substituted for the stearate lubricant employed heretofore and (2) the silane concentration is significantly increased over that employed heretofore. More particularly, this invention is directed to a radiation crosslinkable polymeric composition comprising:

(a) a copolymer of ethylene and a vinyl ester of a $C_2$–$C_6$ aliphatic carboxylic acid, a $C_1$–$C_6$ alkyl acrylate or $C_1$–$C_6$ alkyl methacrylate, (b) from 80 to 400 parts of hydrated inorganic filler per 100 parts of copolymer, (c) 2.5 to 6 parts of an alkoxy silane per 100 parts of hydrated inorganic filler, and (d) a lubricating effective amount of a lubricant comprising lauric acid and ethylene-bis-stearamide.

The present invention may also be described as being concerned with the improvement in a radiation crosslinkable polymeric composition of the type containing:

(a) a copolymer of ethylene and a vinyl ester of a $C_2$–$C_6$ aliphatic carboxylic acid, a $C_1$–$C_6$ alkyl acrylate or $C_1$–$C_6$ alkyl methacrylate, and (b) a silane-treated hydrated inorganic filler, the concentration of said filler being 80 to 400 parts of filler per 100 parts of copolymer, which comprises utilizing as the silane, an alkoxysilane in the amount of 2.5 to 6 parts per 100 parts of filler and incorporating in said composition a lubricating effective amount of a lubricant comprising lauric acid and ethylene-bis-stearamide.

This invention also relates to an electrical conductor coated with a uniinsulating layer comprising these crosslinkable polymeric compositions.

DESCRIPTION OF THE PREFERRED EMBODIMENTS

The present invention relates to radiation crosslinkable polymeric compositions comprising copolymers of ethylene and a vinyl ester of an aliphatic carboxylic acid, an alkyl acrylate or an alkyl methacrylate and a silane-treated hydrated inorganic filler which exhibits significantly higher physical strength in its radiation crosslinked form than comparable radiation crosslinked compositions have exhibited heretofore. Further these radiation cured compositions have physical strength properties substantially similar to those of a comparable chemical crosslinked polymeric composition.

The compositions of the present invention contain many of the components comprising the compositions disclosed in U.S. Pat. Nos. 3,832,326 and 3,922,442 of North et al., the disclosures of which are incorporated herein by reference.

The Crosslinkable Copolymer Components

The terms crosslinkable or crosslinking are ascribed their normal art recognized meaning the present application, i.e., they denote the formation of primary valence bonds between polymer molecules.

Although crosslinking of polymers can be achieved by such known procedures as chemical crosslinking, thermal crosslinking or radiation crosslinking, the compositions of the present invention are preferably crosslinked by radiation means. The basic procedures for radiation crosslinking includes those using cobalt-60, accelerators, beta rays, gamma rays, X-rays, etc. These procedures for radiation crosslinking are extremely well known in the art and will not be described here in detail.

The polymeric component of the present composition is a copolymer of ethylene and a comonomer which may be a vinyl ester, an acrylate or a methacrylate. The vinyl ester may be a vinyl ester of a $C_2$–$C_6$ aliphatic carboxylic acid, such as vinyl acetate, vinyl propionate, vinyl butyrate, vinyl pentanoate or vinyl hexanoate. The acrylates and methacrylates may be any of the $C_1$–$C_6$ alkyl esters including, for example, methyl, ethyl, propyl, butyl, pentyl or hexyl acrylate or methacrylate. The preferred copolymer comprising the polymeric component of this invention is an ethylene-vinyl acetate copolymer containing about 9 to about 90%, preferably about 9 to about 40%, most preferably about 9 to about 28%, vinyl acetate, balance ethylene.

Although the prior art compositions of North et al., of which the present compositions are an improvement, contained an ethylene-vinyl acetate copolymer as the preferred polymeric constituent, minor amounts of other crosslinkable polymers or copolymers could be included. However, ethylene-vinyl acetate copolymer comprised at least 66% of the total polymers present in the North et al. compositions. Representative of the minor polymeric components used in the non-preferred embodiments included polyethylene, copolymers of ethylene with propylene, butene, the acrylates and maleates, polydimethyl siloxane and polymethylphenylsiloxane, copolymers of vinyl acetate with the acrylates, etc. Obviously, mixtures of these minor polymeric components were also used.

Terpolymers of ethylene and vinyl acetate derived from, e.g., any of the corresponding monomeric materials listed above (other than ethylene or vinyl acetate) could also be used. A representative terpolymer would be an ethylene-vinyl acetate-vinyl maleate terpolymer.

The ethylene-vinyl acetate copolymers used by North et al. preferably have a melt index of from about 1.0 to about 20.0.

The polyethylenes used in the North et al. composition include essentially all high, medium and low density polyethylenes as well as mixtures thereof. The most preferred polyethylenes for blending for use as uniisulation for electrical wires and cables generally have a density of from about 0.900 to about 0.950 gm./cc. and a melt index of from about 1.0 to about 10.0.

Although minor amounts of the polymers and copolymers employed in minor proportions by North et al. may also be used in the compositions of the present invention such is not preferred and in fact these non-preferred compositions do not provide the superior physical strength in the crosslinked composition that is obtained when a single copolymer, preferably an ethylene-vinyl acetate copolymer, is employed as the polymeric component.

As is true with the North et al. prior art compositions, the compositions of the present invention provide a superior and unexpected balance of:

1. low temperature brittleness, i.e., the composition will not readily crack during low temperature movement (ASTM D 746).
2. heat resistance after aging, i.e., excellent elongation after extended service at 90° C. and even 125° C.
3. arcing and tracking resistance, as high as 5 KV, whereas even porcelain shows surface breakdown at 4 KV. This property is not often required, however, in the preferred environment of under 600 volt service.
4. flame resistant and flame retardance.
5. moisture resistance, i.e., low mechanical absorption of water which yields a superior dielectric constant.

6. resistance to industrial chemicals.

In addition, when these compositions are radiation crosslinked they exhibit tensile strengths superior to the radiation crosslinked compositions of the prior art and substantially equal to that of the chemically crosslinked prior art compositions.

It is not known why the compositions of this invention provide such a superior balance of properties. It is possible to theorize that there is some synergistic relationship between the ethylene copolymer, silane, hydrated inorganic filler, and the preferred lubricant, but there is no intention to be bound by such a theory. However, it has been established that for low voltage environments, less than 5000 volts, even more particularly for less than 600 volt environments, the compositions of this invention are equal to the prior art for service as uniinsulation. Uniinsulation is an art accepted term denoting insulation where one layer is extruded around the conductor, and this one layer serves as the electrical insulation and the jacketing to provide physical and flame protection. The present compositions are especially adapted for service as uniinsulation in the under 5000 volt, most especially in the under 600 volt range, where only a single extruded coating is used, and it is in the environment that a superior balance of properties is required. It has been further found that ethylene-vinyl acetate copolymers will hold very large amounts of filler and still provide high flexibility and a high degree of crosslinking. The simultaneous achievement of high filler loading, flexibility and crosslinking is quite surprising as high flexibility and high crosslinking are generally believed incompatible, as are high crosslinking and high filler loading (which implies low crosslinkable polymer content). Ethylene-vinyl acetate copolymers further provide superior fire retardance to the polymeric compositions of the present invention.

The above described ethylene copolymers are crosslinked by irradiation with high-energy electron beams. Fully crosslinked, these polymers become thermoset in behavior.

The art of radiation crosslinking is so highly developed that little need be said with respect to such procedures. As higher total doses of radiation are used, the degree of crosslinking generally increases, and for preferred crosslinkings a total radiation dose of about 5–25 megarads will be used.

In general, the higher the degree of crosslinking the more resistant the polymeric composition is to moisture, chemical reagents, etc., and the less resistant the polymeric composition is to abrasion. At lower degrees of crosslinking there is also some loss of heat resistance as well as pronounced effect on percent elongation after aging. The exact degree of crosslinking can, of course, be varied to take the above factors and their effect on the final product into account.

The Silane Component

One or more substituted silanes comprise the second essential component of the polymeric compositions of the present invention.

Any silane may be used in the present invention which will not adversely affect the desired balance of properties and which will help to bind the polymer and inorganic filler of the present invention, provided that the silane is not combustible, e.g., alkoxy and amine silanes, and does not interfere with polymer crosslinking or degrade during polymer processing.

The preferred silanes used in forming the insulating compositions are the alkoxy silanes, e.g., lower alkyl-, alkenyl-, alkynl- and aryl-alkoxysilanes as well as the lower alkyl-, alkenyl-, alkynl- and aryl-alkoxyalkoxy or -aryloxy alkoxy silanes. Specific examples of such silanes are methyltriethoxy-, methyltris(2 methoxyethoxy)-, dimethyldiethoxy-, alkyltrimethoxy-, vinyltris(2-methoxyethoxy)-, phenyl-tris(2-methoxyethoxy)-, vinyltrimethoxy- and vinyltriethoxy-silane.

It is preferred to use the vinyl silanes for best results, and of the vinyl silanes the following are especially preferred:

gamma-Methacryloxypropyltrimethoxy-Silane

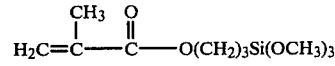

and
Vinyl-Tris(2-Methoxyethoxy)Silane

The Hydrated Inorganic Filler Component

The fillers used in the present invention are the hydrated inorganic fillers, e.g., hydrated aluminum oxides ($Al_2O_3.3H_2O$ or $Al(OH)_3$), hydrated magnesia, hydrated calcium silicate. Of these compounds, the most preferred is hydrated aluminum oxide.

To obtain the superior balance of properties described, it is mandatory that a hydrated inorganic filler be used in formulating the polymeric compositions. It must be emphasized that large proportions of another type of filler, be it inert or not, cannot be added to the compositions and still achieve the superior balance of properties.

The water of hydration in the inorganic filler must be released during the application of heat sufficient to cause combustion or ignition of the ethylene-vinyl acetate copolymer. The water of hydration chemically bound to the inorganic filler is released endothermically. It has been found that the hydrated inorganic filler increased flame retardance in a manner far superior to other fillers previously used by the art to provide insulation with flame retardance e.g., carbon black, clays, titanium dioxide, etc. What is even more surprising is that flame retardance is combined with excellent electrical insulation properties at the high filler loadings used, since at these loadings the copolymeric composition contains a large amount of bound water.

The filler size should be in accordance with those sizes used by the prior art.

The Lubricant Component

When polymeric insulation is formed on conductors by extrusion, it is preferred that a lubricant form a portion of the insulating composition. Such lubricants as a fatty acid soap or a metallic derivative thereof have been used heretofore. The lubricant not only aids in the extrusion process but it also improves the stripping properties of wire insulation thereby facilitating the task of the end-user.

The lubricant component comprises an essential component of the polymeric compositions of this invention. It has been found that the combination of a preferred silane in the required concentration plus a particular two component lubricant composition provided in a lubricating effective amount unexpectedly improves the physical strength of the radiation crosslinked compositions of the present invention.

Calcium stearate has often been employed heretofore as a lubricant for polymeric compostions such as those of North et al. Generally, those which were radiation crosslinked exhibited a tensile strength substantially lower than the chemically crosslinked counterpart. It was found that the physical strength properties of the radiation cured compositions could be improved somewhat if an aluminum stearate replaced the calcium stearate but the physical properties were still less than those of the chemically cured calcium stearate composition.

It has been found, and this is an essential part of the present invention, that a lubricant composition comprising lauric acid and ethylene-bis-stearamide when used in combination with an appropriate quantity of a preferred silane will produce a radiation cured composition with significantly enhanced physical strength properties. The lubricant composition employed in the composition of the present invention is composed of 15-35% lauric acid and 85-65% ethylene-bis-stearamide. One particularly preferred lubricant contains about 25% lauric acid and about 75% ethylene-bis-stearamide and is available commercially under the tradename Mold-Wiz.

The Proportions of the Components

The amounts of polymer and filler can be varied within wide proportions. Best results are obtained in coating, e.g., extruding, onto electrical wire and cables when from 80 to 400 parts of filler, preferably 100-135 parts of filler, per 100 parts of polymer are employed. All percentages and parts referred to herein are by weight, unless otherwise indicated.

As discussed hereinbefore it is the quantity of the silane and the composition of the lubricant which are essential to the improved tensile strength obtained when the compositions of this invention are radiation crosslinked. The useful amounts of silane are from 2 to 8 parts or higher, preferably from 2.5 to 6 parts, of silane per 100 parts of hydrated filler. The required amount of silane is employed in combination with a lubricating effective amount of a lubricant comprising lauric acid and ethylene-bis-stearamide. A lubricating effective amount is generally in the range of 0.5 to 5 parts of lubricant per 100 parts of resin.

The compositions of the present invention may be formed in a number of ways. For instance, the preferred method of filler treatment is by direct addition of the silane to the polymer followed by addition thereto of the filler, the lubricant, and other additives, if desired. This can be done in an internal mixer, such as Banbury or Werner & Pfleiderer mixer. Alternatively, the silane may be added directly to the filler, dispersed therein, and the polymer and lubricant then added.

Any processing device known to the art which insures an intimate mixture of all three essential components may be used, provided the silane is intimately and thoroughly dispersed onto the surface of the hydrated inorganic filler.

It will be apparent that in addition to the essential components of the compositions of this invention, other additives may be present, e.g., pigments, stabilizers, antioxidants (e.g., polymerized trimethyldihydro quinoline) so long as they do not interfere with crosslinking, when desired, or harm desired properties. Such materials are present in very minor proportions, ranging from less than 10% of the polymer, and usually in amounts of less than 5%. There are two reasons amounts of other components are not desirable: firstly, the present composition per se has such superior properties; secondly, any significant amounts of other fillers for example, serve only to degrade or upset the balance of properties.

The following examples will serve to illustrate the subject invention.

The same general procedure was employed in preparing each sample. In each instance the silane under evaluation, the hydrated alumina ($Al_2O_3 \cdot 3H_2O$), the lubricant being evaluated and an antioxidant (polymerized 1,2-dihydro-2,2,4-trimethyl-quinoline, in all instances) were added to the polymeric component and blended therewith. Following mixing, depending on the testing evaluation employed, the polymer composition was either formed into test plaques and radiation cured or extruded onto a copper wire using a Brabender extruder and radiation cured.

EXAMPLE I

Several lubricants were evaluated. Aluminum stearate, which provides superior physical properties to radiation cured composition as compared to the calcium stearate employed in the chemically cured composition, was evaluated against a lubricant composed of lauric acid and ethylene-bis-stearamide. The latter was a mixture of 25% lauric acid—75% ethylene-bis-stearamide available under the trade name Mold-Wiz 33 UDK.

The remaining components were:

| | |
|---|---|
| EVA copolymer (28% VA) | |
| Hydrated alumina | 118 phr |
| Gamma-Methacryloxypropyl-trimethoxy silane | 3 phr |
| Antioxidant | 1 phr |

The test results are presented in Table I below.

TABLE I

| EFFECT OF MOLD WIZ VS. ALUMINUM STEARATE | | |
|---|---|---|
| | 2 phr Al. Stearate | 1 phr Mold Wiz 33UDK |
| 0 MR Cure | | |
| Tensile, psi | 1590 | 1600 |
| Elong., % | 620 | 630 |
| $H_2O$ Absorp. mg/in$^2$ (7 days @ 82° C.) | 46.1 | 35.4 |
| 10 MR Cure | | |
| Tensile, psi | 1990 | 2320 |
| Elong., % | 250 | 220 |
| Swell Ratio/Extract. % | 4.45/9.72 | 4.37/7.77 |
| 12.5 MR Cure | | |
| Tensile, psi | 2110 | 2400 |
| Elong., % | 240 | 200 |
| $H_2O$ Absorp. mg/in$^2$ | 22.0 | 13.1 |
| Swell Ratio/Extract. % | 4.38/8.12 | 3.6/5.69 |
| 15 MR Cure | | |
| Tensile, psi | 2120 | 2410 |
| Elong., % | 210 | 190 |
| Swell Ratio/Extract. % | 4.01/6.52 | 3.28/3.99 |
| 17.5 MR Cure | | |
| Tensile, psi | 1950 | 2220 |
| Elong., % | 200 | 170 |
| $H_2O$ Absorp. mg/in$^2$ (7 days @ 82° C.) | 15.3 | 12.0 |
| Swell Ratio/Extract. % | 4.03/7.15 | 3.36/5.60 |

These data show that a significant increase in tensile strength is realized if aluminum stearate is replaced with a lubricant of lauric acid and ethylene-bis-stearamide in radiation cured alumina-filled EVA compositions. In addition, the use of this two-component lubricant composition also provided decreased water absorption.

EXAMPLE II

The preferred combination of alkoxy silane and a lubricant of lauric acid and ethylene-bis-stearamide was evaluated on a coated wire at a 12.5 MR radiation cure and evaluated against comparative compositions, one of which was peroxide cured and the other was radiation cured.

The sample of the present invention had the following composition:

| EVA copolymer (28% VA) Hydrated alumina | 118 phr |
|---|---|
| Vinyl tris (methoxyethoxy) silane | 3 phr |
| Lubricant - 25% lauric acid/ 75% ethylene-bis-stearamide | 1 phr |
| Polymerized 1, 2-dihydro-2, 2, 4-trimethyl quinoline | 1 phr |

The comparative radiation-curable composition had the following composition:

| EVA copolymer (28% VA) Hydrated alumina | 118 phr |
|---|---|
| Vinyl tris (methoxyethoxy) silane | 1 phr |
| Lubricant - aluminum stearate | 2 phr |
| Polymerized 1, 2-dihydro-2-, 2, 4-trimethyl quinoline | 1 phr |

The peroxide curable composition was similar to the comparative radiation curable composition but contained, in addition, an organic peroxide.

The evaluation of wire coated with these compositions is present in Table II below.

TABLE II

| | Subject Invention | Comparative Product Radiation-Cured | Comparative Product Peroxide-Cured |
|---|---|---|---|
| Unaged | | | |
| Tensile Strength, psi | 2350 | 1380 | 2390 |
| Elongation, % | 260 | 210 | 250 |
| Aged 7 days at 158° C. | | | |
| Tensile Strength, psi | 2910 | 1630 | 2670 |
| Elongation, % | 190 | 220 | 210 |
| Aged 14 days at 158° C. | | | |
| Tensile Strength, psi | 2740 | — | 2670 |
| Elongation, % | 190 | — | 200 |
| Horizontal Flame Appl. Wire | Pass | Pass | Pass |

These data show that increasing the silane level and substituting a lauric acid/ethylene-bis-stearamide lubricant for aluminum stearate provides a radiation cured composition with improved dispersion and improved physical properties. In fact the physical properties of the improved radiation cured composition are comparable to a peroxide crosslinked counterpart.

What is claimed is:

1. A radiation crosslinkable polymeric composition comprising:
   (a) a copolymer of ethylene and a vinyl ester of a $C_2$-$C_6$ aliphatic carboxylic acid, a $C_1$-$C_6$ alkyl acrylate or a $C_1$-$C_6$ alkyl methacrylate,
   (b) from 80 to 400 parts of hydrated inorganic filler per 100 parts of copolymer,
   (c) 2 to 8 parts of an alkoxy silane per 100 parts of hydrated inorganic filler, and
   (d) a lubricating effective amount of a lubricant comprising lauric acid and ethylene-bis-stearamide.

2. A composition according to claim 1 wherein the copolymer is an ethylene-vinyl acetate copolymer.

3. A composition according to claim 1 containing in addition:
   (e) an antioxidizing effective amount of polymerized 1,2-dihydro-2,2,4-trimethyl-quinoline.

4. A composition according to claim 1 wherein the composition is radiation crosslinked.

5. A composition according to claim 1 wherein the silane is vinyl-tris(2-methoxyethoxy)silane or gamma-methacryloxypropyltrimethoxysilane.

6. A composition according to claim 1 wherein the filler is alumina.

7. A composition according to claim 1 wherein the lubricant comprises 15-35% lauric acid and 85-65% ethylene-bis-stearamide.

8. In a radiation crosslinkable polymeric composition of the type containing:
   (a) a copolymer of ethylene and a vinyl ester of a $C_2$-$C_6$ aliphatic carboxylic acid, a $C_1$-$C_6$ alkyl acrylate or a $C_1$-$C_6$ alkyl methacrylate, and
   (b) a silane-treated hydrated inorganic filler, the concentration of said filler being 80 to 400 parts of filler per 100 parts of copolymer, the improvement which comprises utilizing as the silane, an alkoxy silane in the amount of 2 to 8 parts per 100 parts of filler and incorporating in said composition a lubricating effective amount of a lubricant comprising lauric acid and ethylene-bis-stearamide.

9. The improvement according to claim 8 wherein the copolymer is an ethylene-vinyl acetate copolymer.

10. The improvement according to claim 8 wherein the composition additionally contains an antioxidizing effective amount of polymerized 1,2-dihydro-2,2,4-trimethyl-quinoline.

11. The improvement according to claim 8 wherein the composition is radiation crosslinked.

12. The improvement according to claim 8 wherein the silane is vinyl-tris(2-methoxyethoxy)silane or gamma-methacryloxypropyltrimethoxysilane.

13. The improvement according to claim 8 wherein the filler is alumina.

14. The improvement according to claim 8 wherein the lubricant comprises 15-35% lauric acid and 85-65% ethylene-bis-stearamide.

15. An electrical conductor coated with a uniinsulating layer comprising the radiation crosslinkable polymeric composition of claims 1, 2, 3, 4, 5, 6, 7, 8, 9, 10, 11, 12, 13 or 14.

* * * * *